(12) United States Patent
Gebhardt

(10) Patent No.: US 7,013,652 B2
(45) Date of Patent: Mar. 21, 2006

(54) GAS TURBO SET

(75) Inventor: Andreas Gebhardt, Thalwil (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/848,155

(22) Filed: May 19, 2004

(65) Prior Publication Data

US 2005/0132707 A1    Jun. 23, 2005

Related U.S. Application Data

(63) Continuation of application No. PCT/IB02/04736, filed on Nov. 13, 2002.

(30) Foreign Application Priority Data

Nov. 20, 2001 (CH) .................................. 2126/01

(51) Int. Cl.
F02C 3/00 (2006.01)
F23R 3/50 (2006.01)

(52) U.S. Cl. ...................... 60/798; 415/189; 415/209.3

(58) Field of Classification Search ................. 60/798, 60/805; 415/214.1, 213.1, 209.3, 190, 196, 415/197, 189

See application file for complete search history.

(56) References Cited

U.S. PATENT DOCUMENTS

| | | | | |
|---|---|---|---|---|
| 2,676,459 A | * | 4/1954 | Marchant | 60/798 |
| 2,801,822 A | * | 8/1957 | Speed | 415/209.3 |
| 2,851,246 A | * | 9/1958 | Nichols | 415/136 |
| 2,917,276 A | * | 12/1959 | Klompas et al. | 415/189 |
| 3,004,700 A | | 10/1961 | Warren | 230/133 |
| 3,393,894 A | * | 7/1968 | Redsell | 415/189 |
| 4,016,636 A | * | 4/1977 | Schneider et al. | 415/189 |
| 4,522,559 A | | 6/1985 | Burge et al. | 415/196 |
| 4,778,337 A | | 10/1988 | Popp | 415/134 |
| 5,127,797 A | | 7/1992 | Carman | 415/209.2 |
| 5,197,856 A | * | 3/1993 | Koertge et al. | 415/209.3 |
| 5,224,824 A | * | 7/1993 | Eng | 415/209.2 |
| 5,275,532 A | | 1/1994 | Mazeaud et al. | 415/182.1 |
| 5,564,897 A | | 10/1996 | Månsson | 415/190 |
| 6,179,560 B1 | | 1/2001 | Kouris et al. | 415/190 |

FOREIGN PATENT DOCUMENTS

| | | |
|---|---|---|
| CH | 305532 | 2/1955 |
| DE | 195 44 011 A1 | 5/1997 |
| FR | 967431 | 11/1950 |
| GB | 695724 | 8/1953 |

* cited by examiner

Primary Examiner—Ted Kim
(74) Attorney, Agent, or Firm—Steptoe & Johnson LLP

(57) ABSTRACT

A gas turbo set comprises a compressor, combustion chamber and turbine, a common rotor shaft having arranged on it, within the compressor, a plurality of rows of compressor moving blades and, within the turbine, a plurality of rows of turbine moving blades, which alternate with guide vane rows of compressor guide vanes and turbine guide vanes fastened to a carrying structure surrounding the rotor shaft on the outside. Simplified mounting/demounting is achieved with the compressor guide vanes and/or the turbine guide vanes of a guide vane row held in each case in a plurality of separate annular segments together forming a complete ring with at least one guide vane row, and with the annular segments fastened releasably to the carrying structure such that the annular segments, together with the compressor or turbine guide vanes fastened to them, can be removed individually from the carrying structure, while maintaining the carrying structure.

17 Claims, 5 Drawing Sheets

GAS TURBO SET

CROSS-REFERENCE TO RELATED APPLICATIONS

This application is a continuation of the U.S. National Stage designation of co-pending International Patent Application PCT/IB02/04736 filed Nov. 13, 2002, the entire content of which is expressly incorporated herein by reference thereto.

FIELD OF THE INVENTION

The present invention relates to the field of turbines. It refers to a gas turbo set.

BACKGROUND OF THE INVENTION

The temperature of the working medium of a gas turbo set may change relatively quickly as a function of the current operating state. In particular, during the startup and shutdown and in the event of load changes, the components through which the working medium flows are heated or cooled to a great extent, whereas the other components experience a substantially slower temperature change.

Gas turbo sets are known with inner shells serving for routing the working medium and an outer housing for supporting and centering the inner shells. Such housings and inner shells possess a relatively low mass. They are therefore heated relatively quickly and can cool again quickly. By contrast, both the heating and the cooling of the rotors of the compressor and turbine last substantially longer because of their high mass. In view of the resulting different thermal expansion of the components mentioned, the blade play must be such that a brushing of the moving blades against the inner shells or the guide vanes against the rotor shaft is avoided under all operating conditions. The greatest play is required in the event of what is known as a hot start. In order to ensure this blade play, a greater play than that which is necessary per se must be allowed for under full load. However, this reduces the efficiency of the gas turbo set.

In the known gas turbo sets equipped with an outer housing, the latter assumes both the carrying function for the inner shell and the pressure load occurring due to the working medium. On account of this double function, the outer housing cannot be adapted optimally to one of the two tasks, because cutbacks in this case would be necessary in the other respective function.

In particular, during each vane change, the gas turbo set has to be opened in the mid-plane, this being highly labor-intensive. Moreover, the exchange of the vanes can be commenced only when the plant has cooled sufficiently. This results in long standstill times, along with a corresponding interruption in the power output of the gas turbo set.

So that the gas turbo set can be mounted and demounted more simply and more quickly, in other solutions the outer housing has a multipart design. In these solutions, the various housing parts are connected to one another both in the axial direction and in the parting plane by means of flanges. However, such a design is complicated and therefore costly.

A gas turbo set, such as reproduced in FIGS. 1 to 3, was proposed in DE 195 44 011.

The gas turbo set 29 shown in FIGS. 1 to 3 consists of a compressor 1, a turbine 2 and a combustion chamber 3 arranged between these. The compressor 1 and the turbine 2 are arranged on a common rotor shaft 4 which carries a plurality of rows of compressor moving blades 5 and turbine moving blades 6 (FIG. 1).

The gas turbo set 29 possesses a common outer housing 7 in the form of a carrying structure, consisting of two cruciform bearing supports 9 arranged vertically to the flow direction 8 of the working medium and of two or more longitudinal members 10 oriented at right angles to these and connecting the cruciform bearing supports 9 to one another. Each cruciform bearing support 9 is formed by two concentric rings 11, 12. To connect the rings 11, 12, radial ribs 13 are arranged between them. The longitudinal members 10 are distributed uniformly on the circumference of the outer ring 12 and are connected to the latter in a suitable way releasably or unreleasably, for example by means of a welded joint (FIG. 2).

A plurality of vane carriers 14 designed as annular carrying disks are arranged at right angles to the axis of the rotor shaft 4 in the space between the cruciform bearing supports 9 and the longitudinal members 10 and are connected positively to the longitudinal members 10. For this purpose, the carrying disks 14 have corresponding recesses 15 (FIG. 2) which correspond to the shape of the longitudinal members 10. The carrying disks 14 are thus fastened axially displaceably to the longitudinal members 10. In order to fix the axial position of the carrying disks 14, the latter may be additionally screwed (not illustrated) to the longitudinal members 10. A nonpositive or materially integral connection or a combination of types of connection known per se is, of course, likewise possible. A corresponding number of compressor guide vanes 17 and turbine guide vanes 18 (FIGS. 1, 3) is fastened to the carrying disks 14 by means of vane bases 16.

In the downstream region of the compressor 1 and on the turbine side are arranged, inside the cruciform bearing supports 9, the longitudinal members 10 and the carrying disks 14, cooling ducts 19 or other suitable means which are connected to the compressor 1 and which can be acted upon by a liquid or gaseous cooling fluid (FIGS. 2, 3). It is likewise possible to arrange the means or cooling ducts 19 laterally. Cooling also may be implemented by means of an external cooling source.

Both the compressor 1 and the turbine 2 possess in each case an inner shell 20 (FIG. 1) which, together with the surface of the rotor shaft 4, forms a flow path 21 for the working medium and closes off said flow path outwardly. For this purpose, a plurality of heat accumulation segments 22 are releasably arranged in the axial direction between the vane bases 16 of adjacent guide vane rows 17 and 18 of the compressor 1 and of the turbine 2 and, together with the vane bases 16, form the inner shell 20 (FIGS. 1, 3).

The carrying disks 14 of adjacent guide vane rows 18 of the turbine 2 are connected in each case by means of a releasably arranged pressure ring 23 (FIGS. 1, 3). Similar pressure rings 23 are arranged in the downstream region of the compressor 1 between the carrying disks 14 of adjacent guide vane rows 17 (FIG. 1). Between each of the pressure rings 23 and the corresponding heat accumulation segments 22 is formed an annular space 24 (FIG. 3). The annular spaces 24 are connected to the compressor 1. They may, of course, also be fed with an external cooling medium from outside. The carrying disks 14 have in their inner region, in a known way, dovetail guides and the vane bases 16 correspondingly shaped counterpieces which serve for locking the compressor and turbine guide vanes 17, 18.

The outer housing 7 and the carrying disk 14 always have a largely constant temperature on account of their cooling.

The vane bases 16 of the compressor and turbine guide vanes 17, 18 therefore also remain on a constant radius on the carrying disk 14. The minimum blade play can thereby be designed for the full-load point. At the same time, even in the case of a hot start, there is no risk of the brushing of the guide vanes 17, 18 against the rotor shaft 4 or of the moving blades 5, 6 against the heat accumulation segments 22. The operating play both in the case of the turbine 2 and in the case of the compressor 1 can therefore be reduced, with the result that the efficiency increases.

The vane change takes place from outside the cage-like outer housing 7 or the carrying structure, that is to say through this. For this purpose, first the pressure ring 23 is removed, and subsequently the heat accumulation segments 22 which are arranged, in the flow direction 8, upstream of the carrying disk 14 having the compressor or turbine guide vanes 17, 18 to be exchanged. A simple auxiliary device, not illustrated here, is used for supporting the vanes. Thereafter, the carrying disk 14 is displaced horizontally in its recess 15 counter to the flow direction 8. The compressor and turbine guide vanes 17, 18 are then freely accessible, so that their demounting can take place. Finally, as a result, the space for the exchange of compressor or turbine moving blades 5, 6 is also provided. Mounting takes place in reverse order.

The cruciform bearing supports 9, the longitudinal members 10 and the carrying disks 14 are preferably additionally covered with a functional layer for thermal insulation, heat protection layer 27, consisting of ceramic/mineral material (FIGS. 2, 3). Such a heat protection layer 27 is likewise arranged on the pressure rings 23 (FIG. 3). A heat protection mat may, of course, also be used. In order to ensure the stability of the connections, the respective connection regions of these components are designed without a heat protection layer 27.

However, the solution shown in FIGS. 1 to 3 entails problems which are caused, above all, by a complicated mounting/demounting of the compressor guide vanes 17 or turbine guide vanes 18 (see the abovementioned explanation relating to the vane change).

The publications U.S. Pat. Nos. 5,127,797 and 5,564,897 describe gas turbo sets, in which, in the compressor part, the guide vanes of a guide vane row are arranged in each case severally on one annular segment and can be mounted and demounted together with the annular segment. However, the fastening of the annular segments is designed in such a way that, for demounting, the entire outer housing of the compressor has to be demounted.

SUMMARY OF THE INVENTION

The invention permits the design a gas turbo set in such a way that the disadvantages of the prior art are avoided, and in particular, the mounting and demounting of the guide vanes are drastically simplified, and lower vane operating plays are possible.

The invention involves holding guide vanes of a guide vane row in each case in a plurality of separate annular segments which together form a complete ring with at least one guide vane row, and fastening the annular segments releasably to an outer carrying structure, in such a way that the annular segments, together with the guide vanes fastened to them, can be removed individually from the carrying structure, while the carrying structure is maintained. It is thereby possible to dismantle and reinstall the guide vanes directly and without the demounting of the gas turbo set as such.

Mounting/demounting is particularly simple when, according to a preferred refinement of the invention, the annular segments in each case carry compressor guide vanes or turbine guide vanes of a plurality of adjacent guide vane rows.

A further simplification in the mounting/demounting of the gas turbo set arises, overall, when, according to another preferred refinement of the invention, the combustion chamber has an annular design and comprises a plurality of annular segments which are fastened releasably to the carrying structure and which can be removed from the carrying structure, while the carrying structure is maintained, in which case, in particular, the combustion chamber may have arranged in it a plurality of burners which are assigned to the individual annular segments and which can be removed together with these.

A preferred design of the carrying structure according to the invention is characterized in that the carrying structure comprises a plurality of annular carrying disks which are arranged coaxially one behind the other in the axial direction and are spaced apart from one another and which are connected to one another by means of a plurality of longitudinal members extending in the axial direction, and in that the annular segments are arranged between adjacent carrying disks.

The invention may in this case likewise be combined readily with the cooling of the carrying structures which is known from DE 195 44 011. As described in the introduction, this affords the advantageous possibility of dimensioning the blade plays to achieve a minimum under full-load conditions of the gas turbo set.

In conjunction with the carrying structure cooling known per se from the prior art, the application of the invention also affords the advantage, furthermore, that the demounting of the guide vanes can be commenced immediately or at least a comparatively short time after the shutdown of the gas turbo set.

BRIEF DESCRIPTION OF THE DRAWINGS

The invention will be explained in more detail below by means of exemplary embodiments, in conjunction with the drawing in which.

DETAILED DESCRIPTION OF THE PREFERRED EMBODIMENTS

Figure 1:
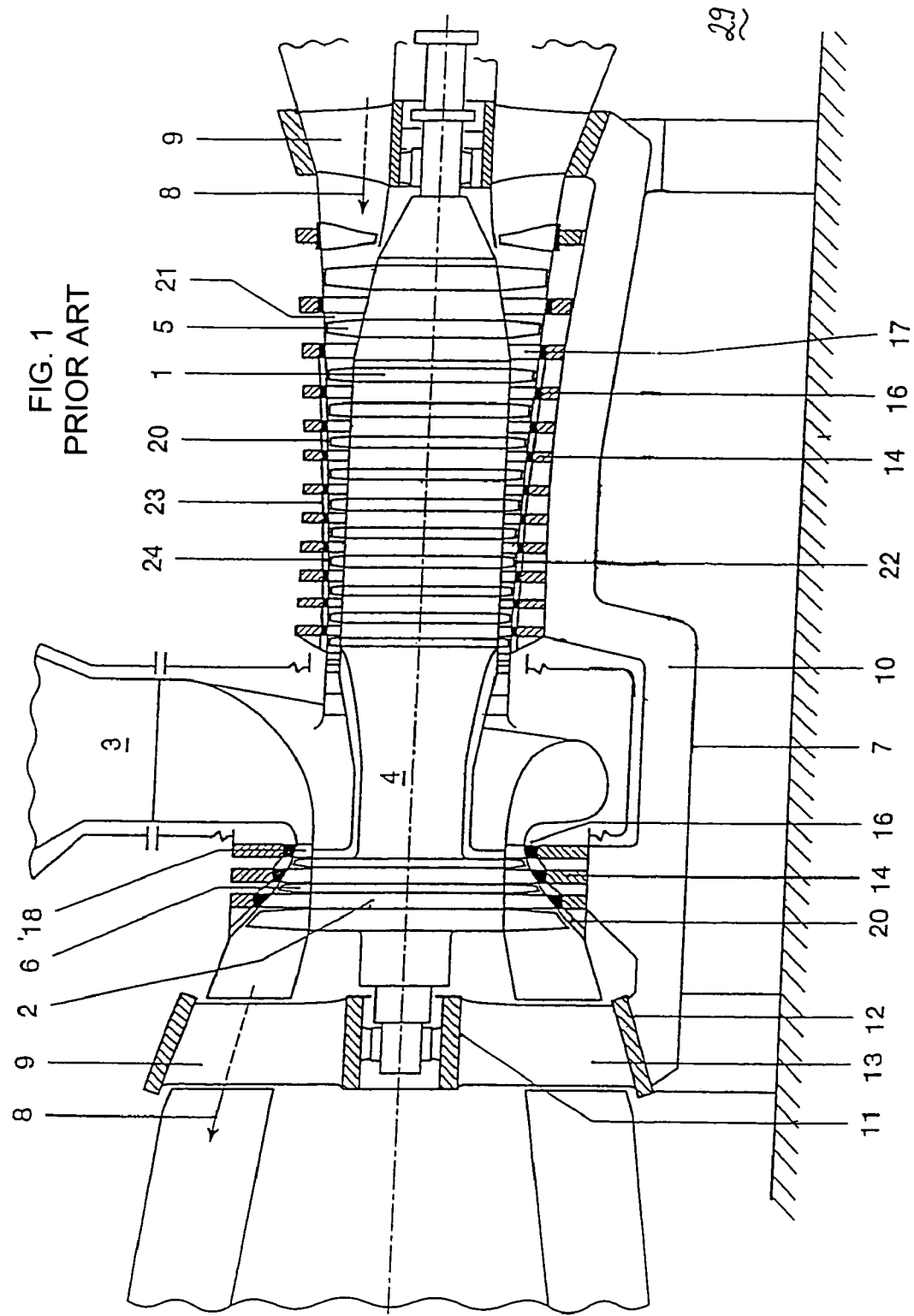
FIG. 1 shows, in longitudinal section, the construction of a gas turbo set with an outer carrying structure from the prior art.
Figure 4:
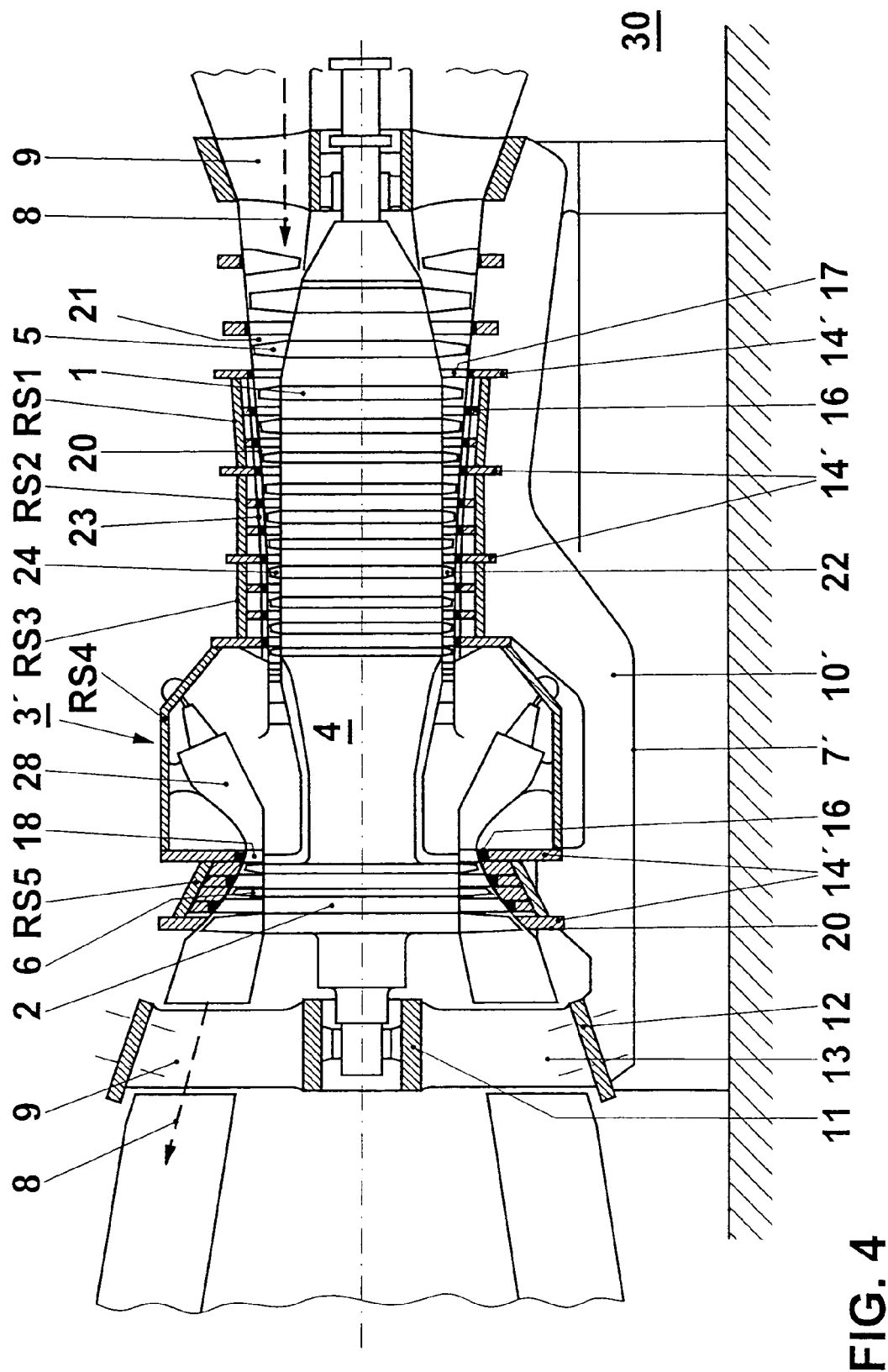
FIG. 4 shows, in an illustration comparable to FIG. 1, a preferred exemplary embodiment of a gas turbo set according to the invention.

FIG. 4 illustrates a preferred exemplary embodiment of a gas turbo set according to the invention in an illustration comparable to FIG. 1. The individual elements of the gas turbo set 30, insofar as they are identical to the illustration in FIG. 1, are designated by the same reference symbols.

The essential differences between the gas turbo set 30 from FIG. 4 and the gas turbo set 29 from FIG. 1 are in the construction of the outer housing or of the outer carrying structure 7 or 7', in the fastening of the guide vanes in the compressor 1 and in the turbine 2, and in the shape and construction of the combustion chamber 3 or 3'.

Figure 2:
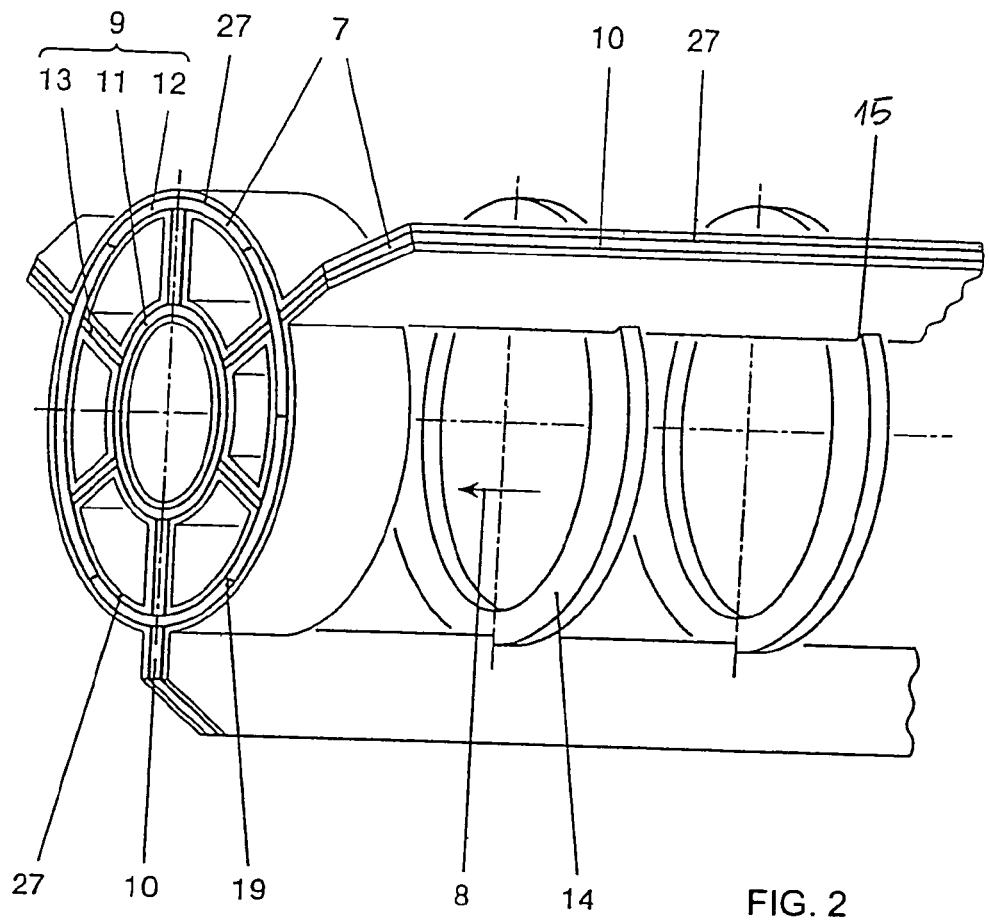
FIG. 2 shows a perspective illustration of the carrying structure from FIG. 1.

Also in the gas turbo set 30, the outer housing or the carrying structure 7' consists of two cruciform bearing supports 9, of the longitudinal members 10' and of a plurality of carrying disks 14' and consequently has a configuration comparable to FIG. 2. In contrast to FIG. 1, however, there is not one carrying disk provided for each guide vane row, but, instead, there are comparatively few carrying disks 14' with a markedly greater clearance relative to one another. Although the carrying disks 14 may also carry guide vanes directly, they actually have the task of making it possible to fasten annular segments RS1, RS2, RS3, RS5 to the carrying structure 7'. In each case a plurality, for example 5 to 10, of these annular segments RS1, RS2, RS3, RS5 separately form an internally insulated ring around the rotor shaft 4, which ring is concentric to the rotor shaft 4 and has arranged one behind the other on its inside a plurality of (two in the example of FIG. 4) guide vane rows. The annular segments RS1, RS2, RS3, RS5 are in each case arranged and fastened between adjacent carrying disks 14' and can be mounted and demounted individually. In this case, the annular segments may, for example, be screwed to the carrying disks in flanged connections, as illustrated by way of example in the figure by merely indicated screws or stud bolts 25. The annular segments may also be suspended in the carrying disks of the carrying structure by means of positive receptacles. It is highly advantageous, in this case, if, for the compensation of differential thermal expansions, the annular segments RS1, RS2, RS3, RS4, RS5 have some displaceability with respect to the carrying structure, in particular with respect to the carrying disks 14', although suitable measures must be taken in the radial direction in order to fix the annular segments to the carrying disks in such a way that brushing damage between the rotor 4 and the annular segments or the moving blades is avoided. The annular segments arranged in an axial position may also be screwed to one another; however, they may likewise also butt against one another so as to be displaceable relative to one another, which may be highly advantageous for the compensation of thermal expansions. Possibilities for also sealing off such mutually displaceable individual parts relative to one another in a gastight manner are familiar to a person skilled in the art, for example, from the arrangement of heat accumulation segments.

Figure 5:
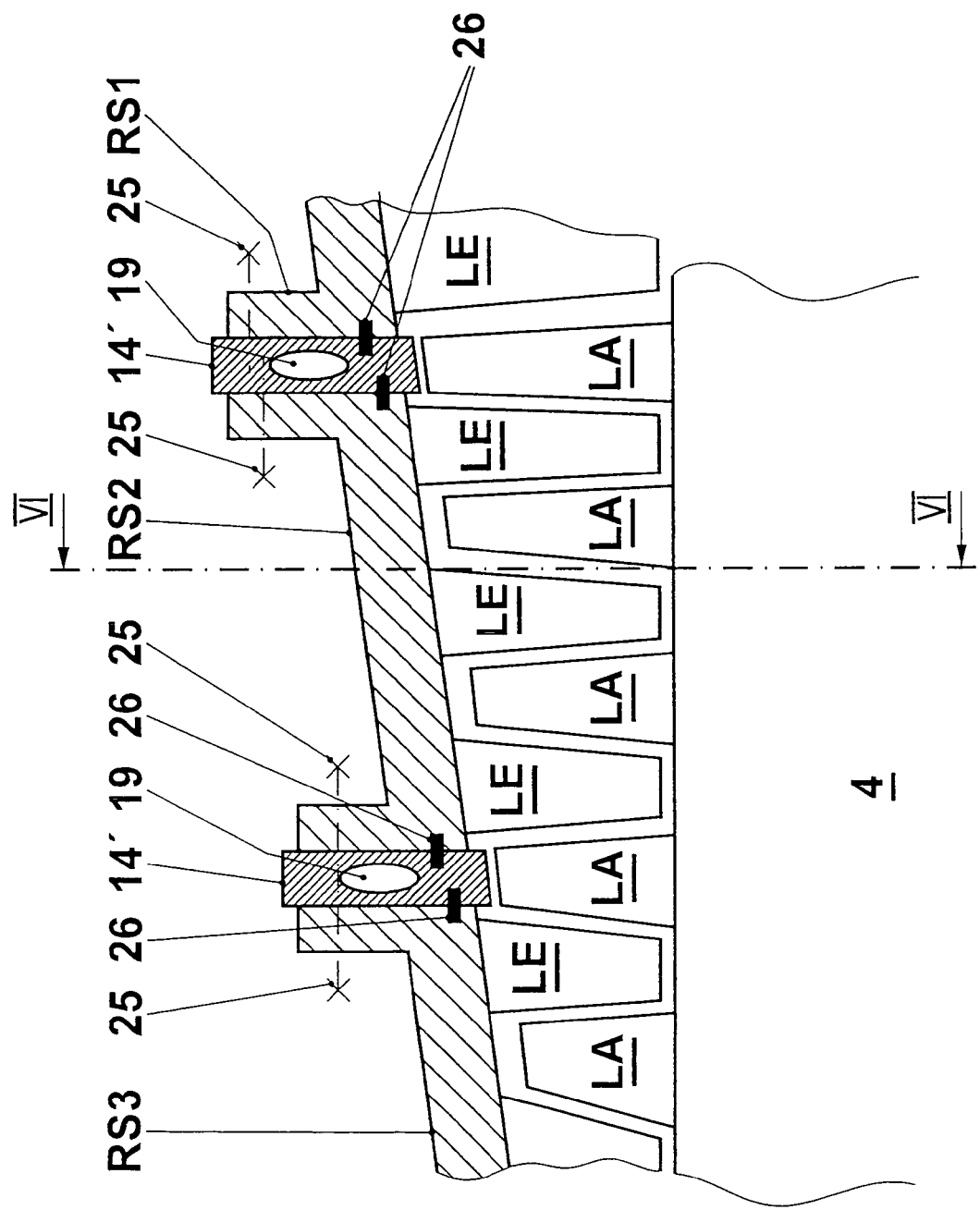
FIG. 5 shows an enlarged illustration of the arrangement of an annular segment in the carrying structure on the circumference of the rotor.
Figure 6:
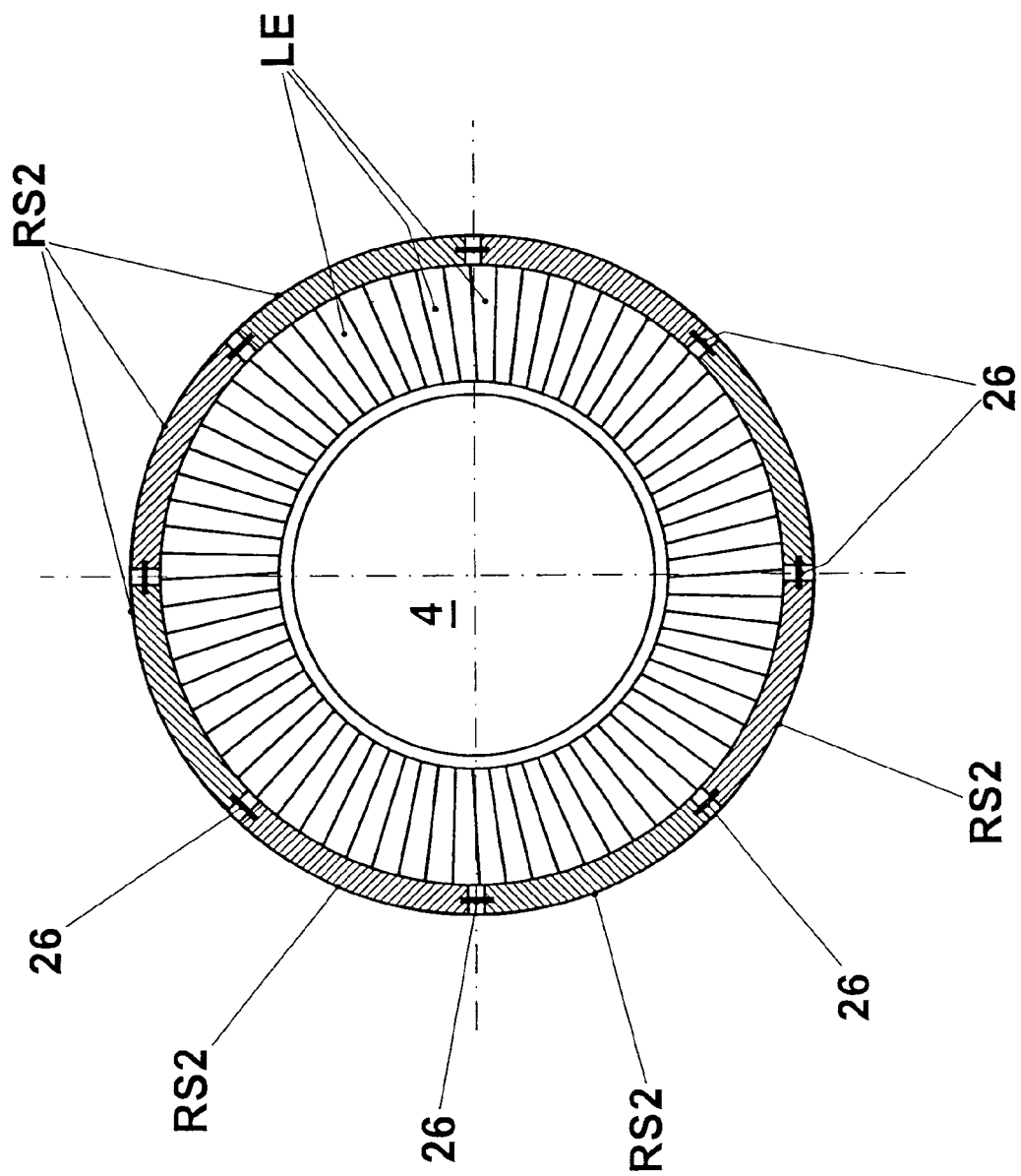
FIG. 6 shows a cross-sectional illustration to make clear the arrangement of the annular segments in the circumferential direction.

FIG. 5 shows an enlarged view of the arrangement of annular segments. As described with regard to FIG. 3, carrying disks 14' of the carrying structure are provided with cooling ducts 19. The advantageous cooling of the carrying structure allows minimal blade plays and therefore the smallest possible gap dimension during operation. Arranged axially between two carrying disks is an annular segment RS2. This carries guide vanes LE of three guide vane rows. The vanes LE of the guide vane rows, in the installation state, are arranged axially alternately with moving blades LA, arranged at the rotor shaft 4, of the moving blade rows. FIG. 6 shows a diagrammatic cross-section in the axial region of the annular segments RS2. Here, for example, 8 annular segments RS2 are arranged on the circumference, which together form a housing ring and which carry the guide vanes LE. As mentioned above, these 8 annular segments may be screwed to one another; however, they may likewise and advantageously also butt against one another so as to be displaceable relative to one another, which may be highly advantageous for the compensation of thermal expansion. Possibilities for also sealing off such mutually displaceable individual parts relative to one another in a gas-tight manner are familiar to a person skilled in the art, for example, from the arrangement of heat accumulation segments. The rotor shaft 4 together with the moving blades LA, which cannot be seen here, is arranged centrally. As is evident from the illustration, each of the annular segments RS2 can easily be demounted in the radial direction when the connection to the carrying structure and, if appropriate, to one another is released. The annular segments are flanged to the carrying structure, for example, by means of screw or stud bolt connections 25 merely indicated in FIG. 5. It is highly advantageous, in this case, if, for the compensation of differential thermal expansions, the annular segments RS1, RS2, RS3, RS4, RS5 have some displaceability with respect to the carrying structure, in particular with respect to the carrying disks 14', although suitable measures must be taken in the radial direction in order to fix the annular segments to the carrying disks in such a way that brushing damage between the rotor 4 and the annular segments or the moving blades is avoided. In order to achieve sealing off for the working medium in spite of the displaceable arrangement, in the exemplary embodiment illustrated sealing elements 26, for example sealing strips, are introduced into grooves of the annular segments and carrying disks. These sealing elements have play in the grooves and consequently allow a movability of the components contiguous to one another which is predetermined essentially by the dimension of the groove. When a pressure difference between the working medium flowing in the machine and the surroundings occurs during operation, these sealing strips are pressed onto the groove walls due to the pressure difference and thus bring about sealing-off. The sealing strips 26 also for sealing off the annular segments butting against one another in the circumferential direction are merely indicated in FIG. 6.

Figure 3:
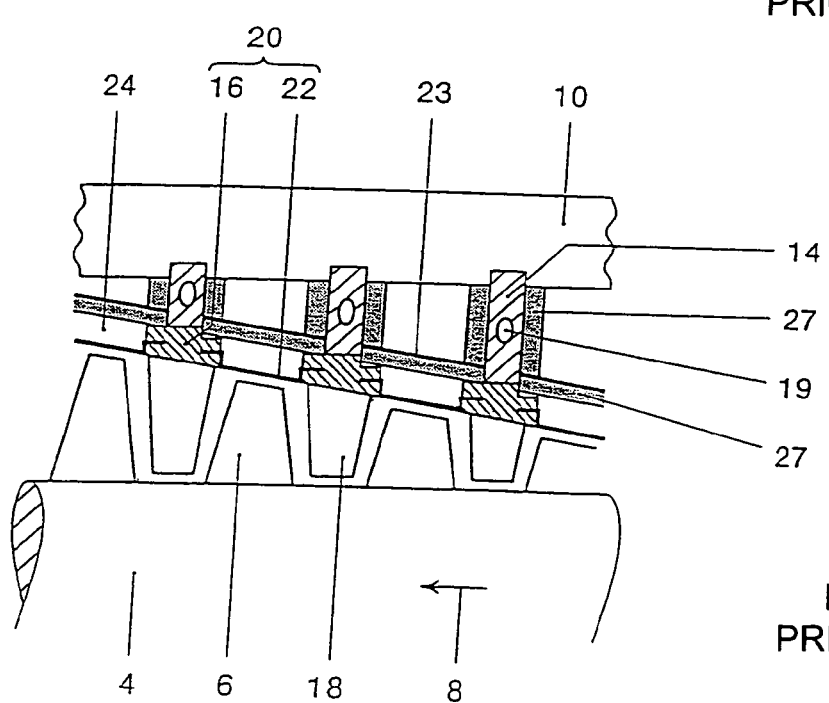
FIG. 3 shows, as an enlarged detail, the arrangement of the guide vanes and moving blades in the gas turbo set according to FIG. 1.

The type of construction according to the invention has the following advantage: in the event of damage to the guide vanes, this can be eliminated quickly, since an opening of the gas turbo set as a whole is no longer necessary. The annular segment having the damaged guide vanes is simply demounted and exchanged for a new one. The outer housing or the carrying structure 7' in this case remains unchanged. In addition, the temperature of the annular segments, when they are provided with internal insulation in a similar way to FIG. 3, is relatively low, with the result that a shorter cooling time after shutdown becomes possible for the demounting of the segments.

The segmentation of the guide vane rows and the advantages associated with this preferably extend to the compressor 1 (annular segments RS1, . . . , RS3) and the turbine 2 (annular segments RS5). A further simplification in mounting/demounting can be achieved when an annular combustion chamber 3' with a plurality of burners 28 arranged in a ring is provided. In this case, the combustion chamber 3' also may comprise a plurality of annular segments RS4 which are fastened releasably to the carrying structure 7' or 9, 10', 14' and which can be removed from the carrying structure 7' or 9, 10', 14', while the carrying structure is maintained, for example when one of the burners 28 has to be serviced or exchanged.

The invention results, overall, in a substantial simplification in the mounting/demounting of the guide vane rows in a gas turbo set.

What is claimed is:

1. A gas turbo set comprising at least one compressor, at least one combustion chamber, at least one turbine, a common rotor shaft, and a supporting structure surrounding the rotor shaft, the rotor shaft bearing a plurality of rows of compressor moving blades within the compressor and a plurality of turbine moving blades within the turbine, the moving blades arranged in rows alternating in a throughflow direction of the gas turbo set, the rows including compressor guide vane rows and turbine guide vane rows, wherein guide vanes of a guide vane row are fastened on a plurality of separate annulus-segment shaped elements, said elements being releasably fastened to the supporting structure, with a plurality of annulus-segment shaped elements being contiguously arranged in a circumferential direction of the gas turbo set and forming a complete annulus with at least one guide vane row, the annulus-segment shaped elements being individually removable from the supporting structure while maintaining the supporting structure;

wherein the combustion chamber has an annular design, the combustion chamber comprising a plurality of combustion chamber annulus-segment shaped elements that are releasably coupled to the supporting structure and are removable from the supporting structure while maintaining the supporting structure; and wherein the combustion chamber further comprises a plurality of coaxially disposed carrying disks and a plurality of burners, each burner being attached to a separate combustion chamber annulus-segment shaped element and each combustion chamber annulus-shaped element being disposed in space between the disks and independently removable from the space.

2. The gas turbo set of claim 1, wherein the annulus-segment shaped elements carry guide vanes of a plurality of guide vane rows.

3. The gas turbo set of claim 1, wherein the supporting structure comprises a plurality of annular supporting disks, the supporting disks being arranged coaxially to one another and axially spaced in an axial direction of the gas turbo set, and the supporting disks being connected to one another by means of a plurality of longitudinal members, with the annulus-segment shaped elements being arranged between adjacent supporting disks.

4. The gas turbo set of claim 1, wherein the annulus-segment shaped elements are connected to the supporting structure by means of flanged connections.

5. The gas turbo set of claim 1, wherein the annulus-segment shaped elements comprise insulation on inner walls thereof.

6. The gas turbo set of claim 1, wherein the supporting structure comprises means for applying a cooling fluid.

7. The gas turbo set of claim 1, wherein the supporting structure comprises a thermal insulation layer.

8. A gas turbo set comprising:
a combustion chamber;
a compressor;
a turbine;
a common rotor shaft bearing a plurality of rows of compressor moving blades and a plurality of rows of turbine moving blades;
a plurality of rows of compressor guide vanes and a plurality of rows of turbine guide vanes;
a supporting structure surrounding the rotor shaft;
a plurality of annulus-segment shaped elements releasably fastened to the supporting structure and disposed concentric to the rotor shaft;
wherein the guide vanes in at least one of said plurality of rows of guide vanes are fastened on multiple annulus-segment shaped elements that together form a complete annulus; and
wherein the annulus-segment shaped elements are individually releasable from the supporting structure while maintaining the supporting structure;
wherein the combustion chamber has an annular design, the combustion chamber comprising a plurality of combustion chamber annulus-segment shaped elements that are releasably coupled to the supporting structure and are removable from the supporting structure while maintaining the supporting structure; and
wherein the combustion chamber further comprises a plurality of coaxially disposed carrying disks and a plurality of burners, each burner being attached to a separate combustion chamber annulus-segment shaped element and each combustion chamber annulus-shaped element being disposed in space between the disks and independently removable from the space.

9. The gas turbo set of claim 8, wherein an annulus-segment shaped element carries guide vanes disposed in a plurality of guide vane rows.

10. The gas turbo set of claim 8, wherein the annulus-segment shaped elements are disposed about the combustion chamber, the compressor, and the turbine.

11. The gas turbo set of claim 8, wherein the supporting structure comprises a plurality of disks disposed in spaced relation along an axis defined by the rotor shaft, with the annulus-segment shaped elements being coupled to the disks.

12. The gas turbo set of claim 8, wherein the annulus-segment shaped elements comprise insulation on inner walls thereof.

13. A gas turbo set comprising:
a combustion chamber;
a compressor;
a turbine;
a rotor shaft defining an axis and extending through the combustion chamber, compressor, and turbine;
rows of compressor moving blades and rows of turbine moving blades;
rows of compressor guide vanes and rows of turbine guide vanes;
a supporting structure surrounding the rotor shaft;
annular-segment shaped elements that each are releasably coupled to the supporting structure and disposed about the axis of the rotor shaft;
wherein each row of guide vanes is supported by a plurality of annular-shaped elements that together form a complete annulus;
wherein the combustion chamber has an annular design, the combustion chamber comprising a plurality of combustion chamber annular-segment shaped elements that are releasably coupled to the supporting structure and are removable from the supporting structure while maintaining the supporting structure; and
wherein the combustion chamber further comprises a plurality of coaxially disposed carrying disks and a plurality of burners, each burner being attached to a separate combustion chamber annular-segment shaped element and each combustion chamber annular-shaped element being disposed in space between the disks and independently removable from the space.

14. The gas turbo set of claim 13, wherein an annular-segment shaped element carries guide vanes disposed in a plurality of guide vane rows.

15. The gas turbo set of claim 13, wherein the annular-segment shaped elements are disposed about the combustion chamber, the compressor, and the turbine.

16. The gas turbo set of claim 13, wherein the supporting structure comprises a plurality of disks disposed in spaced relation along the axis defined by the rotor shaft, with the annular-segment shaped elements being coupled to the disks.

17. The gas turbo set of claim 13, wherein the annular-segment shaped elements comprise insulation on inner walls thereof.

* * * * *